United States Patent
Gonze et al.

(10) Patent No.: US 8,783,016 B2
(45) Date of Patent: Jul. 22, 2014

(54) HYBRID HC ABSORBER/EHC PZEV EXHAUST ARCHITECTURE

(75) Inventors: Eugene V. Gonze, Pinckney, MI (US); Halim G Santoso, Wixom, MI (US); Frank Ament, Troy, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 11/803,683

(22) Filed: May 15, 2007

(65) Prior Publication Data

US 2008/0282686 A1 Nov. 20, 2008

(51) Int. Cl.
*F01N 3/00* (2006.01)
*F01N 3/10* (2006.01)
*F01N 3/02* (2006.01)

(52) U.S. Cl.
USPC ............... 60/285; 60/274; 60/297; 60/300; 60/311

(58) Field of Classification Search
USPC ............... 60/274, 284, 297, 311, 285, 300
See application file for complete search history.

(56) References Cited

U.S. PATENT DOCUMENTS

| | | | |
|---|---|---|---|
| 5,155,995 A | 10/1992 | Kinnear et al. | |
| 5,271,906 A * | 12/1993 | Yuuki et al. | 422/177 |
| 5,315,824 A * | 5/1994 | Takeshima | 60/297 |
| 5,538,697 A * | 7/1996 | Abe et al. | 422/171 |
| 5,634,331 A | 6/1997 | Aoki et al. | |
| 5,979,157 A * | 11/1999 | Kinugasa et al. | 60/274 |
| 6,029,441 A * | 2/2000 | Mizuno et al. | 60/274 |
| 6,112,520 A * | 9/2000 | Kaiho et al. | 60/303 |
| 6,318,076 B1 * | 11/2001 | Kim et al. | 60/300 |
| 6,327,852 B1 * | 12/2001 | Hirose | 60/297 |
| 6,615,578 B2 * | 9/2003 | Yamazaki et al. | 60/284 |

FOREIGN PATENT DOCUMENTS

| | | |
|---|---|---|
| DE | 4236271 A1 | 4/1993 |
| DE | 4435213 A1 | 4/1996 |
| FR | 2878899 A1 | 6/2006 |
| JP | 2003227366 A | 8/2003 |
| WO | WO 00/08329 | 2/2000 |
| WO | WO2006/112511 | 10/2006 |

* cited by examiner

*Primary Examiner* — Thomas Denion
*Assistant Examiner* — Diem Tran

(57) ABSTRACT

A system may include a hydrocarbon (HC) absorber positioned in an exhaust flow path and an electrically heated catalyst (EHC) positioned in the exhaust flow path downstream of the HC absorber.

10 Claims, 3 Drawing Sheets

HYBRID HC ABSORBER/EHC PZEV EXHAUST ARCHITECTURE

FIELD

The present disclosure relates to improved emissions control, and more particularly to emissions control for internal combustion engines.

BACKGROUND

The statements in this section merely provide background information related to the present disclosure and may not constitute prior art.

A hybrid vehicle includes an internal combustion engine and an electric motor to provide vehicle propulsion. Vehicles including an internal combustion engine may also include a catalytic converter to reduce carbon monoxide, volatile organic compounds (VOCs) and NOx.

Catalytic converters may generally operate efficiently at fairly high temperatures. When the engine is first started, the catalytic converter is typically not effective in removing emissions in the exhaust until the catalytic converter reaches an operating temperature called the light-off temperature. Before light-off temperature is reached, HC emissions may not be effectively processed by the catalytic converter.

SUMMARY

According to the present disclosure, a system may include a hydrocarbon (HC) absorber positioned in an exhaust flow path and an electrically heated catalyst (EHC) positioned in the exhaust flow path downstream of the HC absorber.

A method of reducing vehicle emissions includes operating a combustion engine during a first time period and a second time period after the first time period, trapping hydrocarbons (HC) from an exhaust gas from the combustion engine during the first time period in a HC absorber that is in communication with the exhaust gas and upstream of an electrically heated catalyst (EHC) that is in communication with the exhaust gas, energizing the electrically heated catalyst (EHC) during the first time period, and oxidizing HC from the exhaust gas within the EHC during the second time period.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
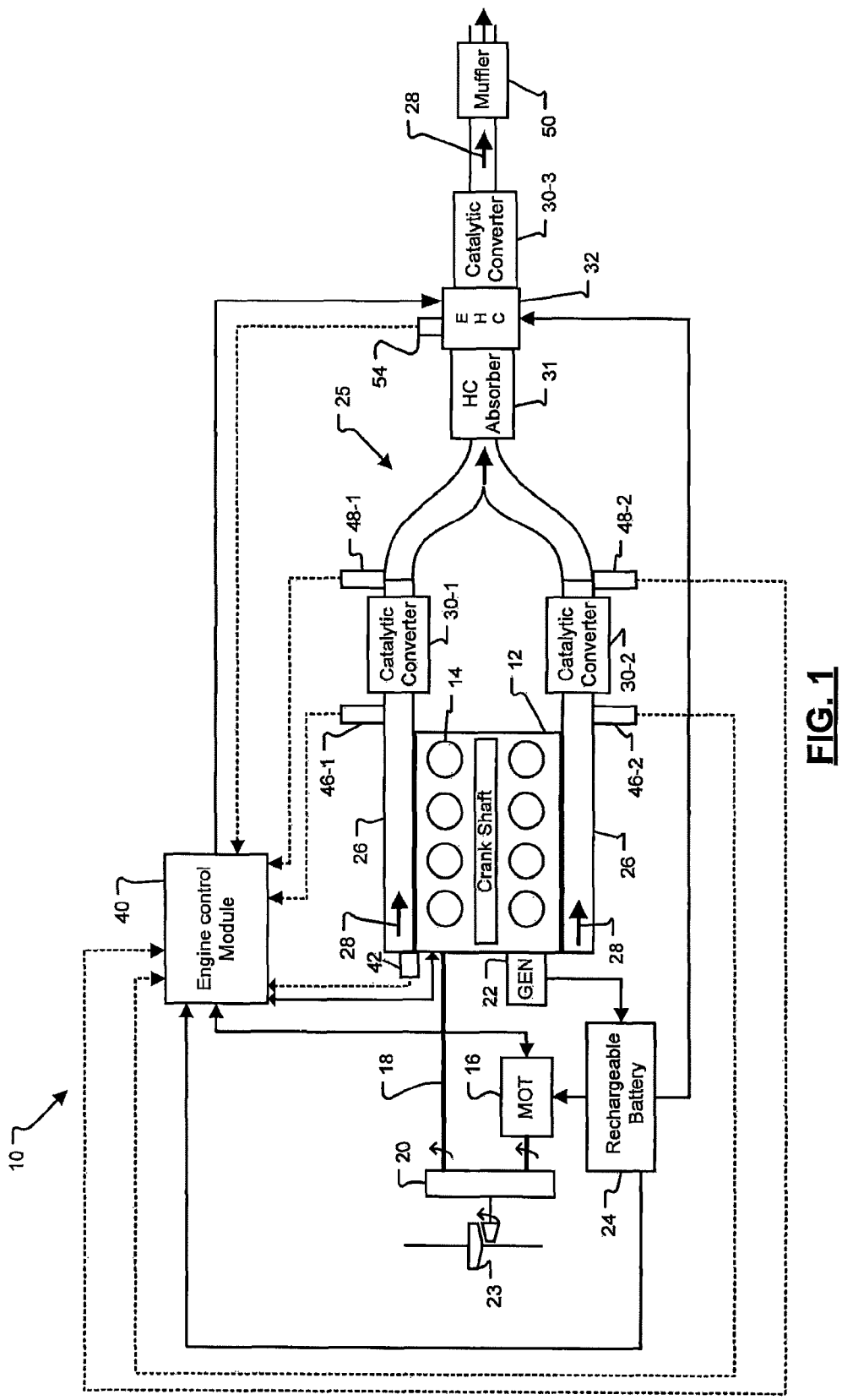
FIG. 1 is a schematic illustration of a hybrid vehicle according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a hybrid vehicle 10 includes an internal combustion engine 12 with a plurality of cylinders 14 and an electric motor 16. The engine 12 is connected to an output shaft 18 that provides rotational power to a transmission 20. A generator 22 is driven by the engine 12 and provides charging current to a rechargeable battery 24. The motor 16 converts power from the battery 24 to mechanical power. The mechanical power is applied to an input shaft of the transmission 20. The transmission 20 combines power from the engine 12 and motor 16 to provide power to a drive axle 23. The engine 12 and motor 16 may provide propulsion simultaneously or independently.

The hybrid vehicle 10 may be a plug-in hybrid. "Plug-in" refers to hybrid vehicles that include a relatively large rechargeable battery 24 providing an extended time between battery 24 recharges. The result is a corresponding savings in fuel and a reduction in emissions by allowing the engine 12 to be shut off for longer periods of time. The plug-in hybrid battery 24 may also be externally recharged between trips, providing a recharge of the battery 24 without running the engine 12.

The engine 12 is connected to an exhaust system 25 including an exhaust manifold 26, a plurality of catalytic converters 30-1, 30-2, 30-3, collectively 30, a hydrocarbon (HC) absorber 31, an electrically heated catalyst (EHC) 32, and a muffler 50. The exhaust manifold 26 directs exhaust gas 28 from the engine 12 to catalytic converters 30, HC absorber 31, and an EHC 32. The plurality of catalytic converters 30 may be three-way catalytic converters. Catalytic converters 30-1, 30-2 may be close-mounted to the engine 12 to promote their efficient heating to light-off.

Figure 2:
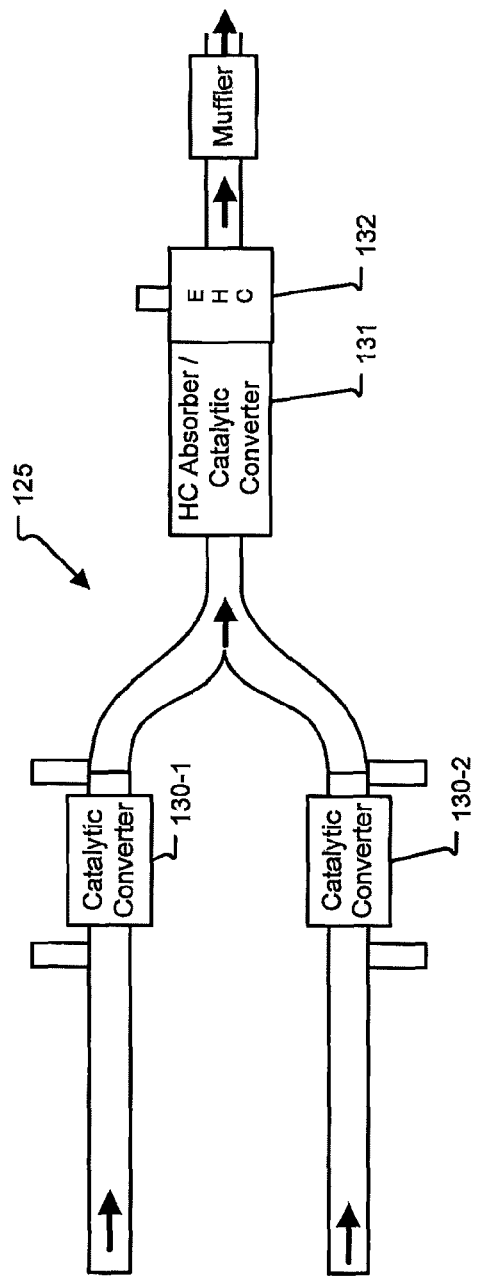
FIG. 2 is a schematic illustration of an alternate exhaust configuration for the hybrid vehicle of FIG. 1.

HC absorber 31 may be disposed between catalytic converters 30-1, 30-2 and catalytic converter 30-3. EHC 32 may be disposed between HC absorber 31 and catalytic converter 30-3. EHC 32 provides supplemental heating to reduce time to catalytic converter 30-3 light-off. As can be appreciated, the EHC 32 may be a separate assembly or formed integrally as part of the catalytic converter 30-3. As seen in FIG. 2, an alternate exhaust system 125 may be generally similar to exhaust system 25. However, rather than including a separate catalytic converter 30-3 and HC absorber 31, a combined HC absorber and catalytic converter 131 may be used. Combined HC absorber and catalytic converter 131 may be located between an EHC 132 and catalytic converters 130-1, 130-2. Combined HC absorber and catalytic converter 131 may generally provide a reduced package size relative to catalytic converter 30-3 and HC absorber 31 of exhaust system 25.

The EHC 32 may be powered by the rechargeable battery 24. Using rechargeable battery 24 as a power source for EHC 32 may generally provide for a reduced heating time for EHC 32 relative to traditional, non-hybrid powertrain systems due to the relatively high power provided by rechargeable battery 24. For example, EHC 32 may be heated to a temperature of at least 400 degrees Celsius in approximately 15 seconds or less. The catalytic converter 30-3, HC absorber 31, and EHC 32 may be an integrated "add-on" to an existing exhaust system architecture.

An engine control module 40 communicates with the EHC 32, the engine 12, the motor 16, the battery 24 and receives inputs from a number of sensors. The sensors may include an engine coolant temperature sensor 42, a first plurality of oxygen sensors 46-1, 46-2, collectively 46, a second plurality of oxygen sensors 48-1, 48-2, collectively 48, and an EHC temperature sensor 54. Oxygen sensors 46 may be located between the engine 12 and the catalytic converters 30-1, 30-2. The oxygen sensors 46 sense oxygen content in the exhaust gas to properly adjust the air-fuel ratio for proper stoichiometry. As can be appreciated, the oxygen sensors 46 may be located in other positions or omitted. Oxygen sensors 48 provide diagnostic information relating to catalytic converters 30-1, 30-2 and may be located downstream from the plurality of catalytic converters 30-1, 30-2.

The temperature of EHC 32 may be directly measured via a temperature sensor 54 or the engine control module 40 may estimate the EHC temperature. Various data, including current passing through EHC 32, the voltage supplied to EHC 32, the volume flow rate of exhaust gas 28 passing through EHC 32 and the time elapsed for each of these parameters may be provided to engine control module 40 to estimate the temperature.

Figure 3:
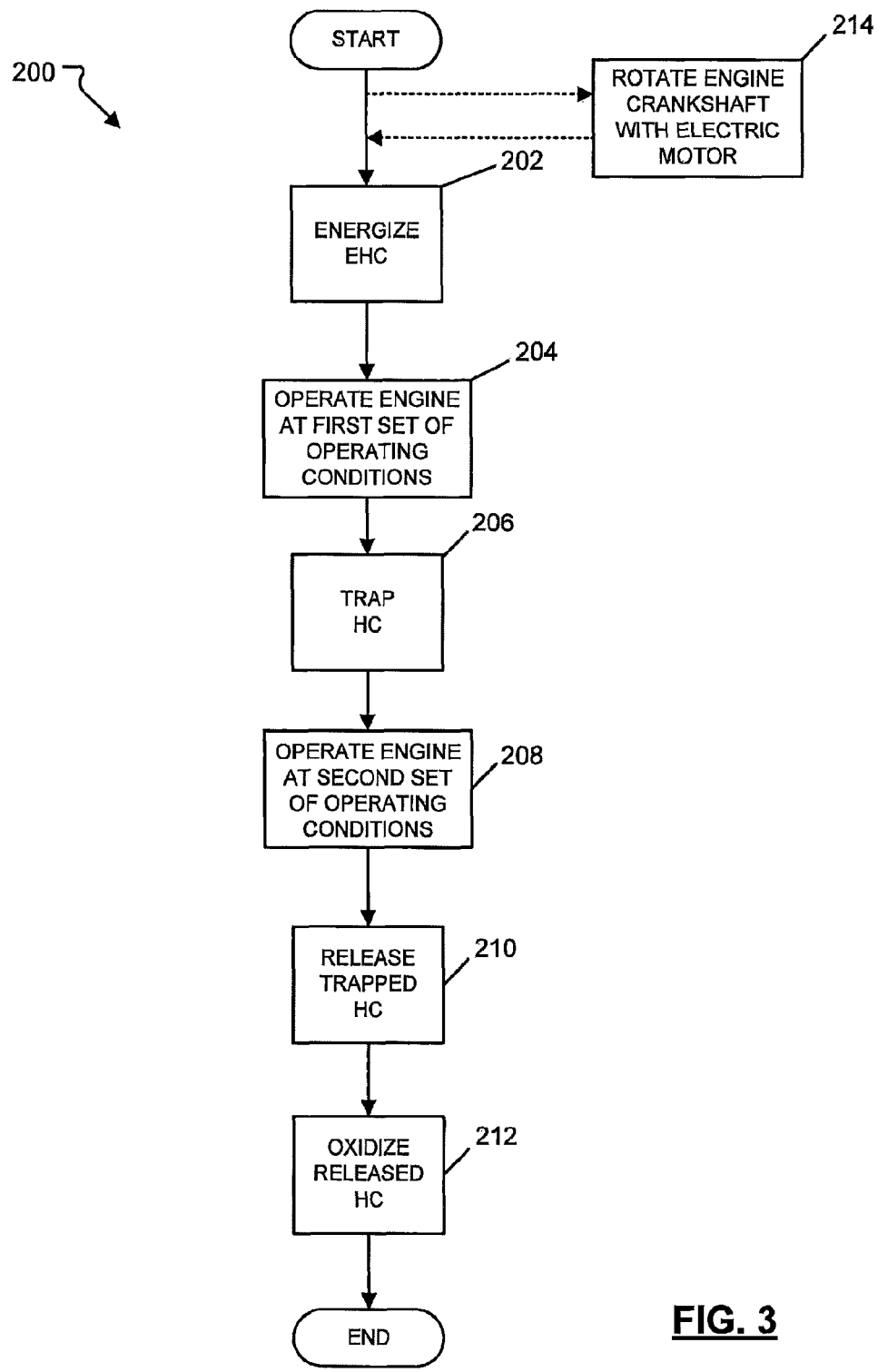
FIG. 3 is a flow diagram illustrating operation of the hybrid vehicle of FIG. 1.

With reference to FIG. 3, operation of hybrid vehicle 10 during a cold start condition is generally illustrated at flow diagram 200 and may generally include operating engine 12 during first and second time periods. A determination of an engine cold start condition may be made in a number of ways including monitoring an engine coolant temperature provided by engine coolant temperature sensor 42. For simplicity, operation with respect to exhaust system 25 will be discussed with the understanding that the discussion applies equally to exhaust system 125. The first time period may generally correspond to an initial period after engine 12 has been started and the second time period may include the period immediately thereafter. EHC 32 may be energized at a time generally corresponding to the starting of engine 12 at step 202. Alternatively, EHC 32 may be energized slightly before or after engine 12 has been started.

As indicated above, operation of engine 12 results in an exhaust gas 28 being supplied to exhaust system 25. Exhaust gas travels from catalytic converters 30-1, 30-2 to HC absorber 31, to EHC 32, and finally to catalytic converter 30-3. During operation of engine 12 during the first time period, engine 12 may be operated at a first set of operating conditions, as indicated at step 204, and catalytic converters 30 may be at a temperature below a light-off temperature needed to oxidize hydrocarbons present in the exhaust gas 28. However, HC absorber 31 is able to trap HC in the exhaust gas 28 during operation in the first time period, as indicated at step 206. The HC may remain trapped by HC absorber 31 during operation at temperatures below approximately 100 degrees Celsius. The temperature of HC absorber 31 may generally be at or below 100 degrees Celsius during the first time period.

To minimize emissions during the first time period, operation of engine 12 at the first set of operating conditions may include operation at an air-fuel ratio that is less than a stoichiometric ratio (rich operation). Rich operation of engine 12 generally provides a reduced NOx emission level, but increases HC emissions. As previously described, HC absorber 31 traps HC emissions of engine 12 during the first time period. Accordingly, this architecture optimizes both HC and NOx emissions.

As indicated above and illustrated at step 202, during the first time period, EHC 32 is energized and is increasing in temperature. Once EHC 32 reaches a temperature needed for oxidation of HC, the second time period for engine operation may begin and engine 12 may be operated at a second set of operating conditions, as indicated at step 208. Oxidation of HC may occur at temperatures greater than 400 degrees Celsius. During the second time period, HC absorber 31 may exceed a trapping temperature and release the HC previously stored therein, as indicated at step 210. For example, HC absorber 31 may release trapped HC when it reaches temperatures greater than 100 degrees Celsius. Since EHC 32 is heated independently of exhaust gas 28 and is disposed downstream of HC absorber 31, EHC 32 may oxidize HC released from HC absorber 31, as indicated at step 212, prior to catalytic converter 30-3 reaching the light-off temperature.

The second set of operating conditions may include an air-fuel ratio of engine 12 generally at a stoichiometric ratio. The second time period may generally correspond to HC absorber 31 exceeding the trapping temperature and EHC 32 exceeding the oxidation or light-off temperature. EHC 32 may continue to be energized during the second time period until engine 12 is out of a cold start condition. More specifically, the second time period may terminate once exhaust system 25 is capable of processing exhaust gas 28 without the use of HC absorber 31 or EHC 32, such as when catalytic converters 30 reach light-off temperature.

In an alternate operation or in addition to the operation of engine 12 during a cold start condition, as discussed above, engine 12 may be operated initially using motor 16 as indicated at step 214. More specifically, before injecting fuel into cylinders 14 and firing engine 12, motor 16 may rotate the crankshaft for a predetermined period. The crankshaft of engine 12 may be initially rotated to a speed of greater than or equal to 350 RPM by motor 16. Engine 12 may be operated using motor 16 until a predetermined operating condition is reached. Additional steps may also be taken to reduce a warm-up time for operation of exhaust system 25. For example, operation of engine 12 at the first set of operating conditions may include retarding the spark of engine 12.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method, comprising:
   operating a combustion engine in a hybrid vehicle at an air-fuel ratio that is less than a stoichiometric air-fuel ratio during a first time period and at a generally stoichiometric air-fuel ratio during a second time period after the first time period, the hybrid vehicle including the combustion engine, an electric motor, and a battery that powers the electric motor;
   trapping hydrocarbons (HC) from an exhaust gas from the combustion engine during the first time period in a HC absorber that is in communication with the exhaust gas and upstream of an electrically heated catalyst (EHC) that is in communication with the exhaust gas;
   energizing the EHC with the battery during the first time period; and
   oxidizing HC from the exhaust gas within the EHC during the second time period.

2. The method of claim 1 further comprising rotating a crankshaft of the combustion engine using the electric motor when the combustion engine is not in an operating state during a vehicle cold start condition and before operating the combustion engine during the first time period.

3. The method of claim 1 wherein said trapping includes operating the HC absorber at a temperature less than 100 degrees Celsius.

4. The method of claim 1 wherein said energizing occurs simultaneously with or before said operating.

5. The method of claim 1 further comprising determining if the engine is operating at a cold start condition.

6. The method of claim 5 wherein operation of the combustion engine during the first time period corresponds to a cold start condition.

7. The method of claim 1 wherein said oxidizing includes operating the EHC at a temperature greater than 400 degrees Celsius.

8. The method of claim 7 wherein the EHC reaches a temperature of 400 degrees Celsius before the HC absorber reaches a temperature of 100 degrees Celsius.

9. The method of claim 1 further comprising releasing the trapped HC from the HC absorber to the exhaust gas during the second time period.

10. The method of claim 9 wherein said releasing occurs during or after said oxidizing.

\* \* \* \* \*